Nov. 19, 1935. G. D. MALKASIAN 2,021,190
MEANS FOR HOLDING DENTAL FILMS
Filed Oct. 5, 1934

INVENTOR,
George D. Malkasian,
BY
Harry W. Bowen.
ATTORNEY.

Patented Nov. 19, 1935

2,021,190

UNITED STATES PATENT OFFICE 2,021,190

MEANS FOR HOLDING DENTAL FILMS

George D. Malkasian, Longmeadow, Mass.

Application October 5, 1934, Serial No. 747,018

7 Claims. (Cl. 250—34)

This invention relates to improvements in means for holding dental films, when the film is being exposed.

An object of my invention is to provide, in combination with a dental film, means for properly positioning the film and holding it securely in position during exposure.

A further object of my invention is to provide in a holder for dental films, means whereby the patient may hold the film in position, without the aid of an assistant or nurse, thereby avoiding the dangers incident to over-exposure of an assistant, caused by repeated exposures to the X-rays while holding the films in position for one patient after another.

A still further object of my invention is to provide, in combination with a dental film, a simple and inexpensive holding means, which may be destroyed after the film is exposed, thereby, eliminating the unsanitary conditions incident to repeated use of a film holder and the necessary sterilizing operations required by repeated use of film holders now in use.

These, and other objects and advantages of my invention, will be more clearly and completely described and disclosed in the accompanying specification, the drawing, and the appended claims, which form a part of the application.

Broadly, my invention comprises, in combination with the usual dental film pack, comprising a film proper and a layer of paper or other suitable material adjacent each face of the film, a pair of grip members secured to the film pack, the exposed portion of the grip members being covered with a resilient material for providing a grip for the teeth of a patient, the grip members being made of a readily bendable material for varying the position of the covered portions and the film pack to fit different conditions, so that the X-rays will be projected onto the film at right angles to the plane of the film.

A preferred embodiment of my invention is illustrated in the accompanying drawing, in which:—

Referring now to the drawing in detail, in which like numerals refer to like parts throughout:—

Figure 5:
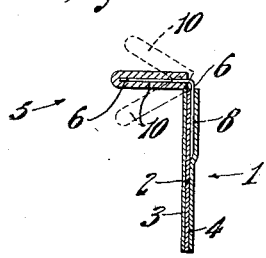
Fig. 5 is a sectional view on the line 5—5 of Fig. 4.
Figure 6:
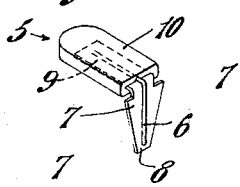
Fig. 6 is a perspective view of one of the grip members removed from the film.
Figure 7:
Fig. 7 is a sectional view on the line 7—7 of Fig. 6.

A film pack 1, comprising a sensitized film 2 and its protective paper covers 3 and 4, has secured thereto two grip members 5, 5. The clips 5, which are formed of a wire 6, of material soft enough to be readily bendable, are encased in a jacket 7 of paper, or other suitable material. This jacketed wire 6 is then bent at approximately right angles, as shown in Fig. 5, and a portion 8 thereof inserted between the film 2 and the cover 4, and secured in place with a suitable adhesive. The exposed, or end portion 9, of the jacketed wire 6 is covered with a resilient casing 10, of soft rubber, or other suitable material.

Figure 1:
Fig. 1 is a diagrammatic view, showing the film in position for exposing the teeth in the right side of the lower jaw of a patient.
Figure 2:
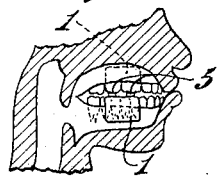
Fig. 2 is a partial, sectional view showing the film pack in position on the lower jaw of a patient.
Figure 3:
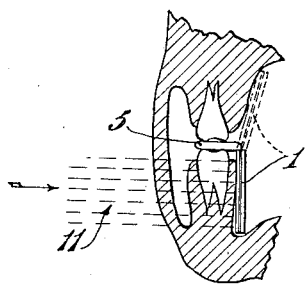
Fig. 3 is a cross sectional view through the cheek and the upper and lower jaw of a patient, showing the film pack in two positions; one being in a depending position, and the other in a vertical position.
Figure 4:
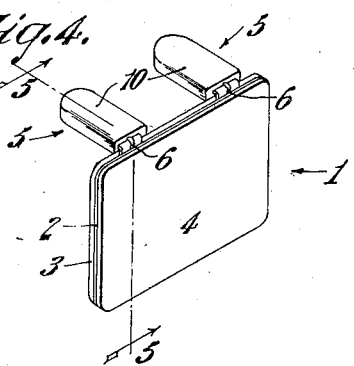
Fig. 4 is a perspective view of the film pack with the grip members secured thereon.

When the film pack is to be used, or exposed, it is placed in the mouth of a patient by the dentist, or his assistant, and properly positioned therein for the required exposure. It is necessary for best results to direct the exposing rays perpendicular to the plane of the film pack, as indicated by the lines 11 in Fig. 3. With the lamp in position, but inoperative, the assistant can easily position the film pack in proper position in the patient's mouth. The patient is then directed to clamp the rubber-covered portions 10 of the grips 5 between his teeth, thus holding the film pack firmly in position, without assistance, while the exposure is made. After the film pack is removed, and during development of the film, the covers 3 and 4, and the grips 5, are removed from the film and discarded, or destroyed. In positioning the film pack in the mouth, the wire 6 may be readily bent, if necessary, as indicated by dotted lines in Fig. 5, in order to change the relative positions of the resilient gripping portions 10 and also the film pack 1, in order to conform to the best advantage with contours within the patient's mouth, as indicated by the dotted lines in Fig. 3.

By using these grips in combination with the standard film pack, it may be properly positioned for any exposure involving the teeth or jaw, either upper or lower, front or back, and firmly and securely held in position by the patient, without assistance during exposure. The dentist and his assistants are relieved from dangerous exposure of the X-rays, and, the patient is also relieved from the discomfort of clumsy and awkward holders and is assured that the film pack and grips are being used for the first and only time, which is a sanitary consideration.

Whereas, I have shown, for purposes of illustration, a round wire 6 as a foundation for the grip member 5, it will be well understood by those skilled in the art that a flat strip of soft, or bendable metal may be used in place of the wire 6, and this flat, metallic, strip may be used with, or without the paper jacket 7.

It should be stated, in connection with the advantages and use of my improvement for holding dental films by the patient between the teeth, that the film is retained in a definitely fixed position, which is usually not the case, when the patient holds the film with his thumb or finger. Oftentimes, the patient is more or less nervous during the exposure of the film, which results in the patient moving the film, when held by hand, away from its intended position; with the result that there is a distortion effect of the picture on the film, due to foreshortening or lengthening of the shadows on the film. A poor picture of the tooth, or teeth, intended, is the result.

My device, being held by the patient's teeth, eliminates excessive flow of saliva, caused by the thumb, or finger of the patient, in his mouth. Also, there is this advantage, that there is very seldom any gagging by the patient, when the film is fixedly held between the teeth.

There is, further, no distortion effect, when the film is fixedly held by the patient between his teeth. The picture is then taken for the exact portion of the tooth, or teeth, intended. That is to say; from the crown portion downward, if on the lower jaw. The root of the tooth is then all included in the picture.

The entire film is also utilized for the purpose desired and not a portion of it wasted, for the reason that the film is gripped by the teeth at the edge of the film, when the patient grips the rubber-covered parts 5, 5.

What I claim is:—

1. In combination with a dental film pack having a cover for the film member, two spaced bendable grip members each having a portion thereof inserted between the film member and the cover.

2. In combination with a dental film pack having a film member and a cover for the film member, a plurality of grip members of easily bendable material having a portion thereof inserted between said film member and said cover and secured therein, the grip members having an extended portion, a resilient casing on the extended-portion of said grip member, whereby each may be bent independently of each other for positioning the film in the mouth prior to gripping the resilient casing by the teeth of the patient for retaining the film in place during exposure.

3. As an article of manufacture, an insertable grip member for attachment to and supporting a dental film between the cover and film comprising, an easily bendable wire member, a covering of paper on the insertable portion of said member, and a resilient casing on an opposite portion of said member.

4. As an article of manufacture, for the purpose described, a grip member for attachment to and for supporting dental films comprising, a bendable wire, a paper casing on said wire to form a flat portion, and a resilient casing on the opposite end portion of said bendable wire for engagement by the teeth of a patient.

5. In combination with a dental film pack having a film member and a protective covering for the film member, a pair of bendable grip members attached to said protective covering and having a free end portion thereof projecting beyond an edge of said film pack, a resilient covering for said end, said grip members being spaced from each other, whereby each member may be bent independently of the other.

6. A grip member for holding dental film packs comprising, a bendable strip having an end portion thereof being wedge-shaped for insertion between the laminations of a dental film pack, and a resilient casing on the remaining portion of said strip, whereby when the film is to be exposed the said grip is bent for insertion between the teeth for accurately positioning the film.

7. In combination with a dental film pack having a film member with a protective covering for the film member, an insertable grip member comprising a bendable wire, a covering for the wire having an end portion thereof being wedge-shaped for insertion between the said film member and the said protective covering and the remaining portion thereof projecting above the edge of said film pack, and a soft resilient casing on said projecting portion.

GEORGE D. MALKASIAN.